United States Patent [19]

Wilson

[11] Patent Number: 5,882,024
[45] Date of Patent: Mar. 16, 1999

[54] SELF PROPELLED TROLLEY

[76] Inventor: Conan Edward Wilson, 86 Lavender Close, Thornbury, Bristol BS12 1UL, United Kingdom

[21] Appl. No.: 750,387
[22] PCT Filed: Jun. 12, 1995
[86] PCT No.: PCT/GB95/01363
  § 371 Date: Dec. 9, 1996
  § 102(e) Date: Dec. 9, 1996
[87] PCT Pub. No.: WO95/34463
  PCT Pub. Date: Dec. 21, 1995

[30] Foreign Application Priority Data

Jun. 15, 1994 [GB] United Kingdom .................. 9411962
Nov. 4, 1994 [GB] United Kingdom .................. 9422255

[51] Int. Cl.$^6$ ............................................... B62M 29/02
[52] U.S. Cl. ......................................... 280/219; 280/221
[58] Field of Search .................................. 280/218, 219, 280/220, 221

[56] References Cited

U.S. PATENT DOCUMENTS

| 1,268,449 | 6/1918 | Gartley | 280/221 |
| 1,383,468 | 7/1921 | Lagelbauer | 280/221 |
| 1,677,061 | 7/1928 | Toman | 280/221 |
| 2,775,488 | 12/1956 | Wingrove | 280/219 |
| 4,275,881 | 6/1981 | Armstrong | 280/218 |
| 4,696,485 | 9/1987 | Lee | 280/221 |

FOREIGN PATENT DOCUMENTS

100731  8/1923  Germany .

*Primary Examiner*—Kevin Hurley
*Attorney, Agent, or Firm*—Wenderoth, Lind & Ponack, L.L.P.

[57] ABSTRACT

A trolley supports a person on a platform (1) and moves as a result of his changing weight distribution so that he can conveniently perform tasks above his normal reach. The platform (1) is supported on springs (2) on a frame (3) with castor wheels (4). Rods (6) are suspended from the platform at an angle, extend to the ground and are arranged so that when one side of the platform is depressed a rod engages the ground and moves the trolley in that direction. By changing his weight distribution the person on the platform causes other rods to brake or drive the trolley in other directions.

11 Claims, 8 Drawing Sheets

SELF PROPELLED TROLLEY

This invention relates to a self propelled trolley.

BACKGROUND OF THE INVENTION

Step ladders or planks supported on scaffolding or trestles are normally used by persons carrying out tasks above their normal reach. When these tasks cover large areas, for example plastering a ceiling, either the step ladder must be moved frequently or a large working platform constructed and subsequently dismantled. Both methods considerably extend the time and effort to perform the task.

SUMMARY OF THE INVENTION

According to the present invention there is provided a self propelled trolley comprising a platform supported on springs on a frame carried on castor wheels and has drive rods suspended from the platform, the drive rods being adapted to engage the ground at an angle other than 90 degrees such that a person standing on the platform by shifting his weight can propel the trolley in any direction or brake to arrest motion.

BRIEF DESCRIPTION OF THE DRAWINGS

Specific embodiments of the invention will now be described by way of example with reference to the accompanying drawings in which.

DETAILED DESCRIPTION OF THE PREFERRED EMBODIMENTS

Figure 1:
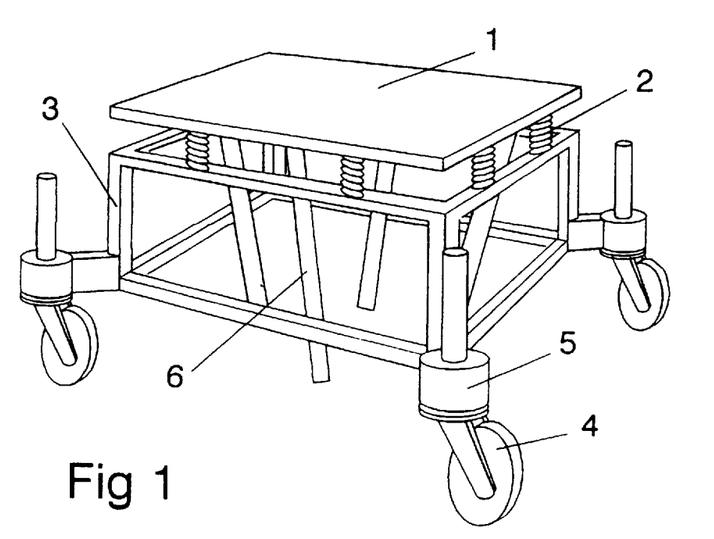
FIG. 1 shows in perspective a rectangular multi-directional version of the self propelled trolley.
Figure 2:
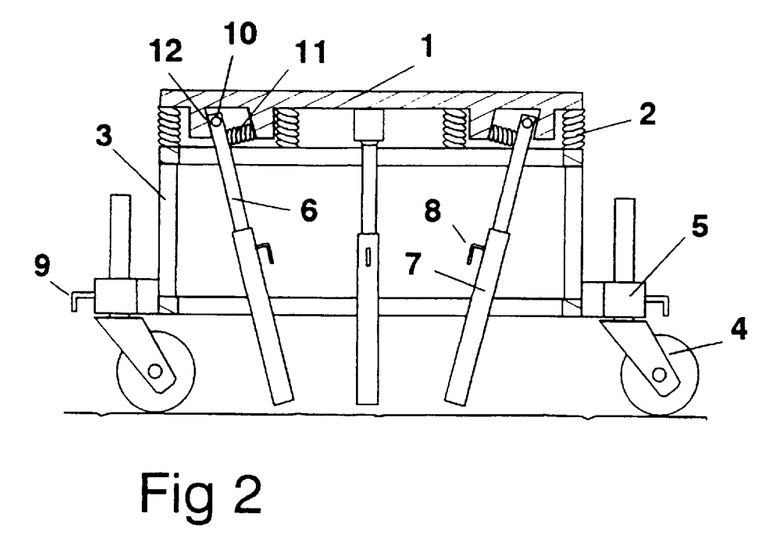
FIG. 2 shows its mid cross-section elevation view.
Figure 3:
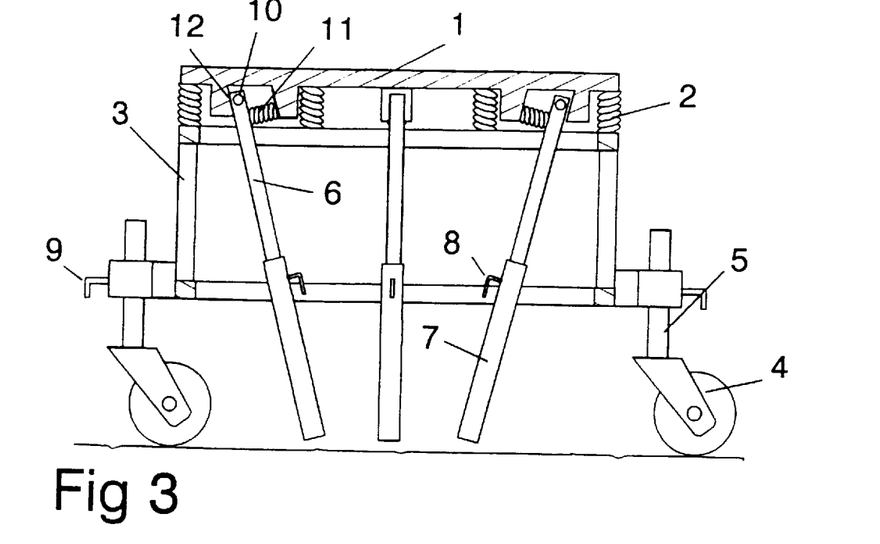
FIG. 3 shows its platform adjusted to a higher level.

Referring to the drawings 1, 2 and 3, the self propelled trolley shown in FIG. 1 comprises the platform 1 supported by a multiplicity of compression springs 2. These in turn are located on the top of the rigid frame 3. Lugs 5 attached to the frame carry castor wheels 4 and extend outwards so that the platform 1 cannot overhang the wheel contact points on the ground. Suspended from the platform are a multiplicity of angled drive rods 6.

FIG. 2 shows a cross-sectional view of the trolley. Drive rods 6 are shown in more detail. They can be extended in length by sliding the sleeve 7 and are then secured by clamp 8. A typical drive rod 6 is suspended from the platform 1 by the universal pivot 10 and assumes its correct angle by resting against the location stop 12 forced by gravity or more positively by the compression spring 11 to do so. When the person's weight is uniformly distributed on the platform the drive rods are just clear of the ground. To adjust the height of the platform the castor wheels 4 slide in lugs 5 and are secured in position by clamps 9.

FIG. 3 shows the platform 1 at a higher level with castors 4 and drive rods 6 extended. In this example the platform height can be adjusted between 450 mm and 750 mm from the ground.

Figure 4:
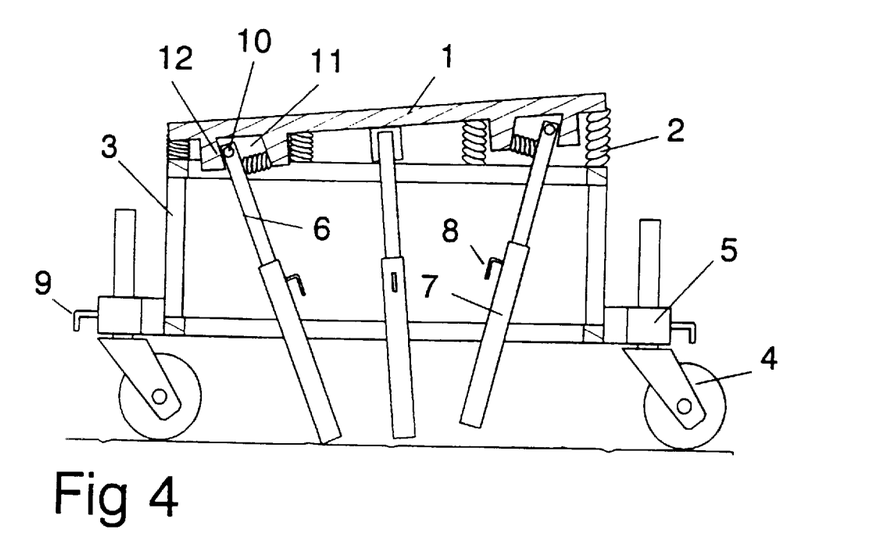
FIG. 4 shows the trolley mechanism in operation.

Operation of the trolley is illustrated in FIG. 4. This is the same cross-sectional view as shown in FIG. 2 but with the weight of the person biased to the left. In reaching the position shown, the left drive rod engages the ground, partly takes the weight of the person and applies a force that moves the trolley to the left. During this movement the angle of the acting drive rod to the vertical increases and other drive rods lift further clear of the ground. Repeated shifting of the person's weight to level and then depress the platform on the left generates continuous motion to the left. Depression of the platform to the right brakes and stops the trolley. Similar actions by the person in any direction causes the trolley to move or brake in that direction with either single or adjacent rods coming into operation.

Figure 5:
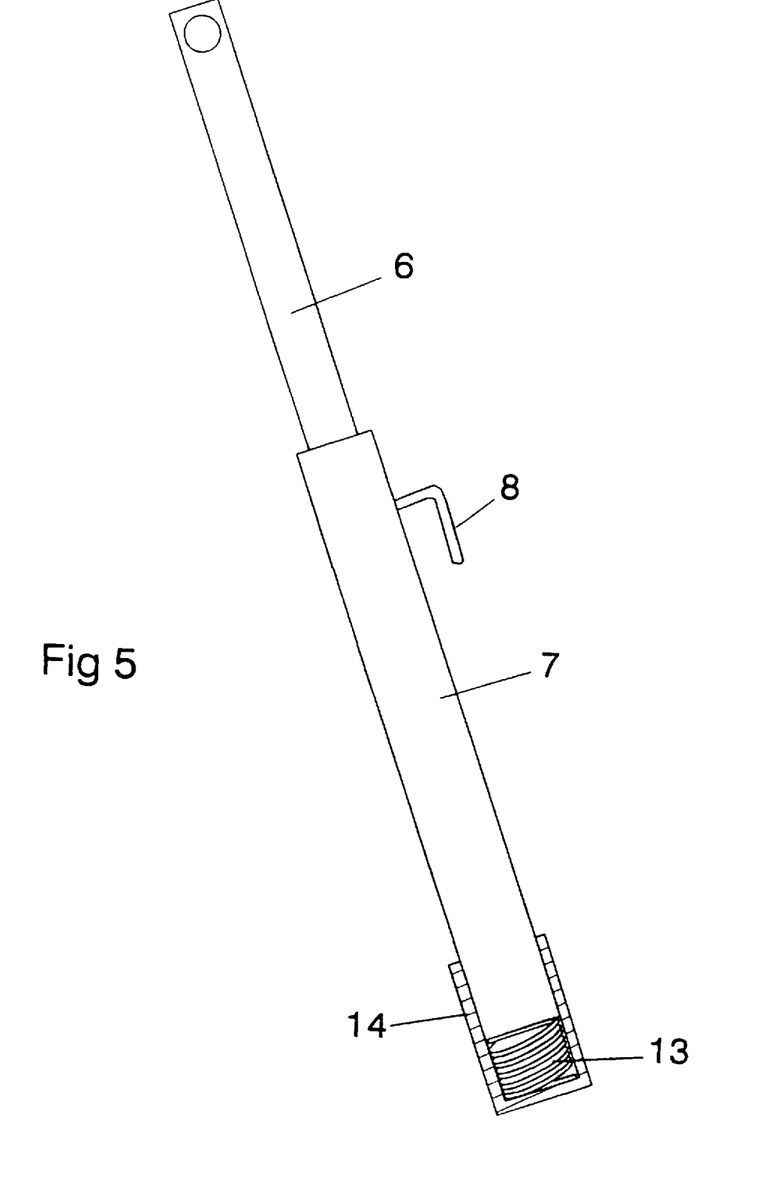
FIG. 5 shows its rod detail with additional spring feature.
Figure 6:
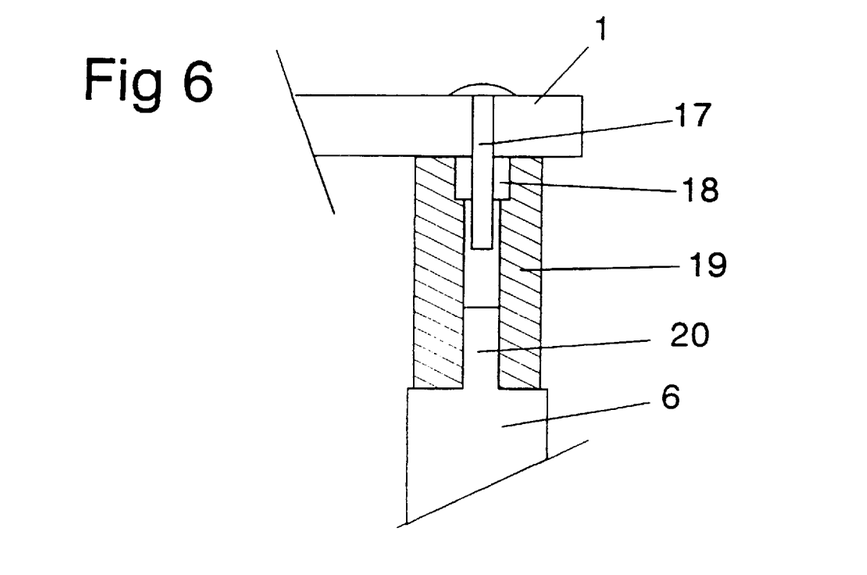
FIG. 6 shows in section a flexible rubber coupling between drive rod and platform.
Figure 7:
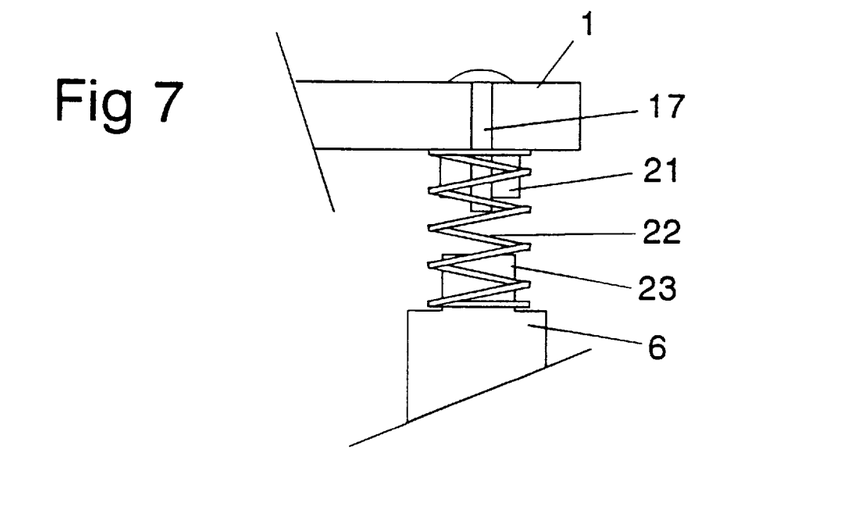
FIG. 7 shows in section a flexible metal spring coupling between drive rod and platform.
Figure 8:
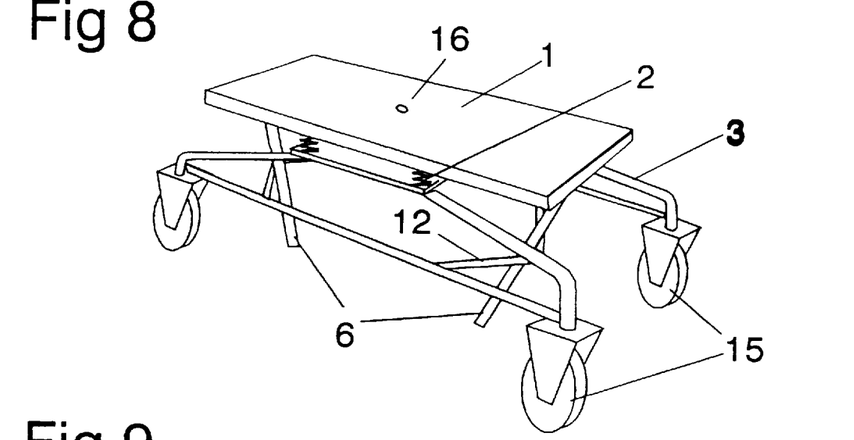
FIG. 8 shows in perspective a single directional version of the self propelled trolley.
Figure 9:
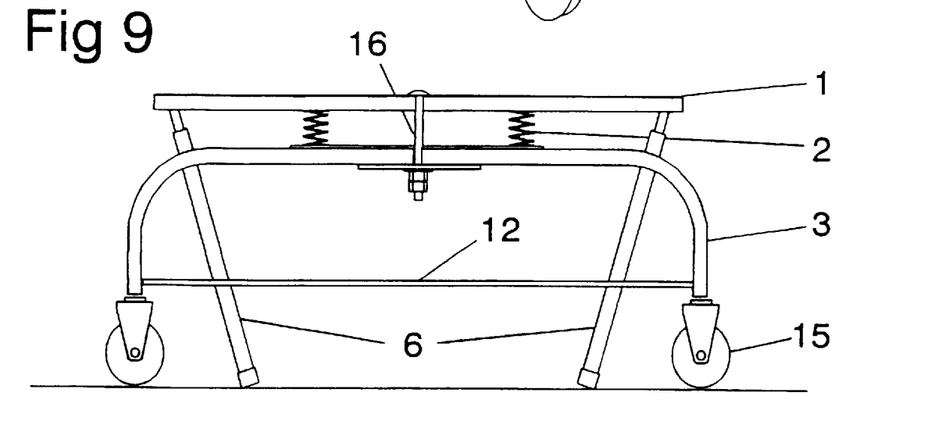
FIG. 9 shows its mid cross-section as a side view.
Figure 10:
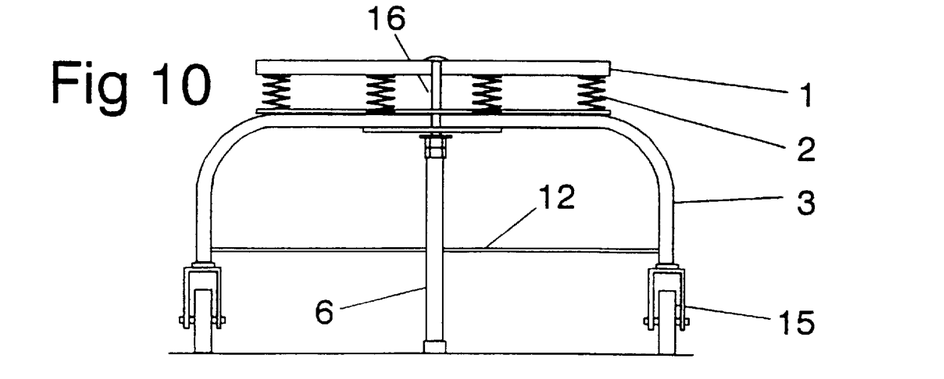
FIG. 10 shows its mid cross-section as an end view.

A further refinement of the drive rods 6 is shown in FIG. 5 where a spring mechanism is incorporated. In this example this is achieved by containing the compression spring 13 within the sleeve 14 which slides on the sleeve 7. This has the effect of smoothing the action of the drive rods in propelling the trolley. Alternatively flexible mouldings, for example of rubber, can be attached to the ends of the drive rods to provide the smooth action and also provide better grip at the foot of the rod and serve as a simple flexible spring coupling with the platform at the top of the rod. This is illustrated in FIG. 6 in which the rubber moulding 19 has an integral nut 18 to provide a bolt fixing 17 to the platform 1 and at its other end provides a force fit onto the spigot 20 extending from the drive rod 6. A metal spring version of this is shown in FIG. 7 in which the spring 22 is a force fit onto the nut 21, which is secured by the bolt 17 to the platform 1, and at its other end is a force fit onto the spigot 23 extending from the drive rod 6. As a second example of the invention a simplified version is limited to straight line movement and is shown as a perspective view in FIG. 8, a mid cross-section side view in FIG. 9 and a mid cross-section end view in FIG. 10. As in the first example the platform 1 is supported on compression springs 2 from the riged frame 3. Fixed direction wheels 15 are secured to the frame 3. In this example the drive rods 6 rest on the ground when the platform 1 is level but when raised rest at an angle in the 'V' locations 12. Thus when the platform 1 is level the rods 6 automatically resist movement in the direction of wheel alignment and the fixed wheels resist movement in other directions. Depression of either end of the platform 1 by the operator shifting his weight on the platform moves the trolley through the action of the drive rods 6. The springs 2 are grouped towards the center of the platform 1 and are compressed, typically to a combined load of 200 kilograms, by the central bolt 16 so providing a central area of the platform 1 that is stable for the operator to stand upon.

Figure 11:
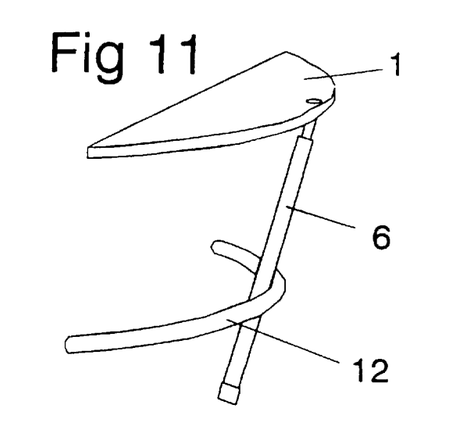
FIG. 11 shows a simple rest location for a drive rod.
Figure 12:
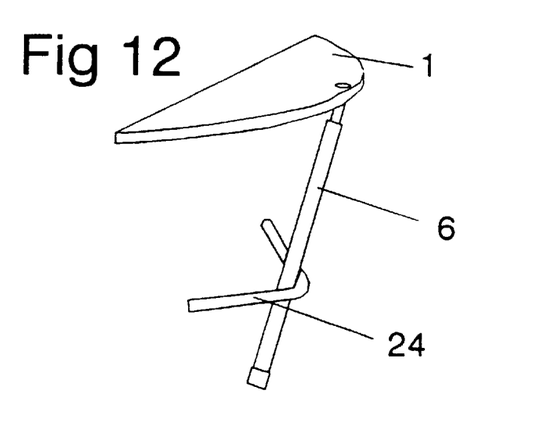
FIG. 12 shows a more positive 'V' location for a drive rod.
Figure 13:
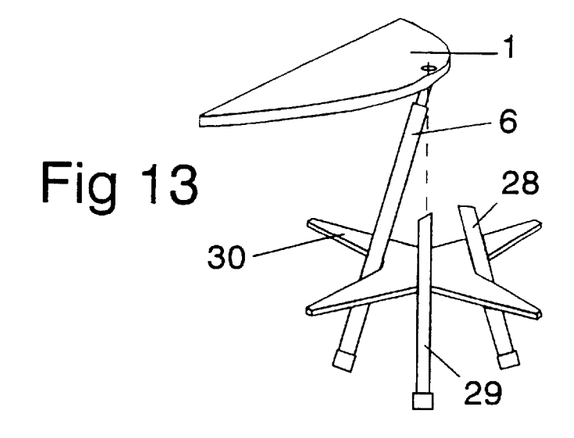
FIG. 13 shows multiple rest locations for alternative drive rod driving directions.

In these first two examples the drive rods 6 all point inwards towards the center of the trolley for the sake of design compactness. The angular location may be at the top of the drive rods or part way down their length as illustrated in FIGS. 11, 12 and 13. In FIG. 11 the angular alignment of the drive rod 6, supported from the platform 1, is by a common location ring 12. In FIG. 12 a more precise and individual 'V' location 24 is used. However, different alignments of drive rods may be used as illustrated in FIG. 13. With outwardly aligned drive rods 28 the trolley moves in the opposite direction to that caused by inwardly aligned drive rods 6 when the operator applies his weight over the rod. Side alignment of rods 29 causes rotation of the trolley. If all drive rods are aligned in the same direction then any action of the operator will cause the trolley to move in one direction only and thus achieve higher speeds.

Figure 14:
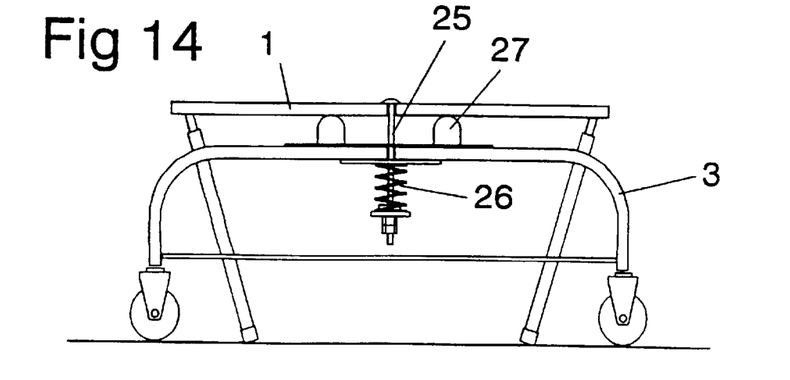
FIG. 14 shows an alternative platform support and spring arrangement.

An alternative platform support and spring arrangement is shown in FIG. 14. The platform 1 is supported from the frame 3 on two pivots 27 for the single direction trolley. These pivots 27 take the form of a single central annular ring or central array of pivots in the case of a multi directional trolley. The assembly is secured by the bolt 25 which is tensioned by the compression spring 26. Alternatively several centrally placed spring tensioned bolts may be used. The platform 1 is very stable with the operator standing in its central area but still rocks freely when he shifts his weight to the outside of the platform.

Figure 15:
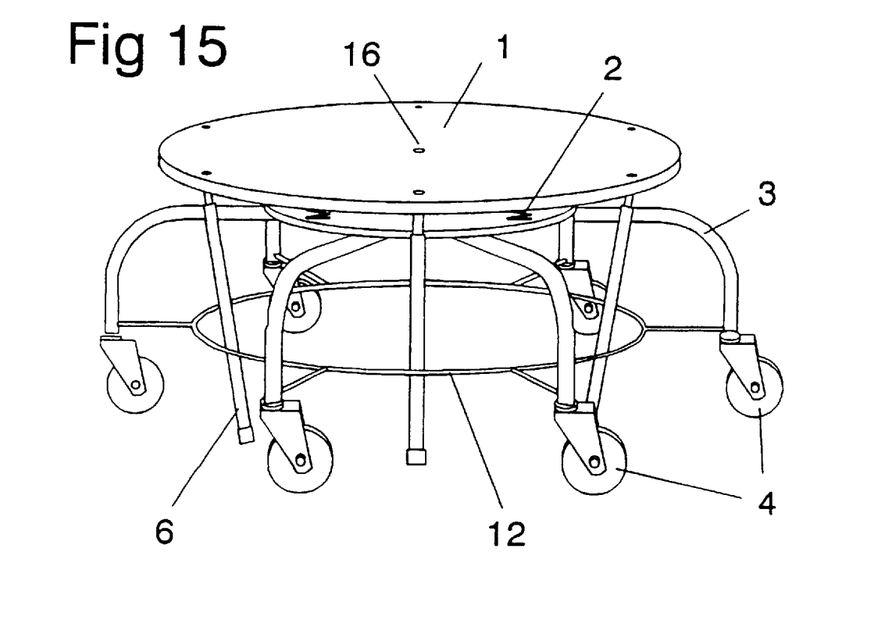
FIG. 15 shows a round multi directional version of the self propelled trolley.
Figure 16:
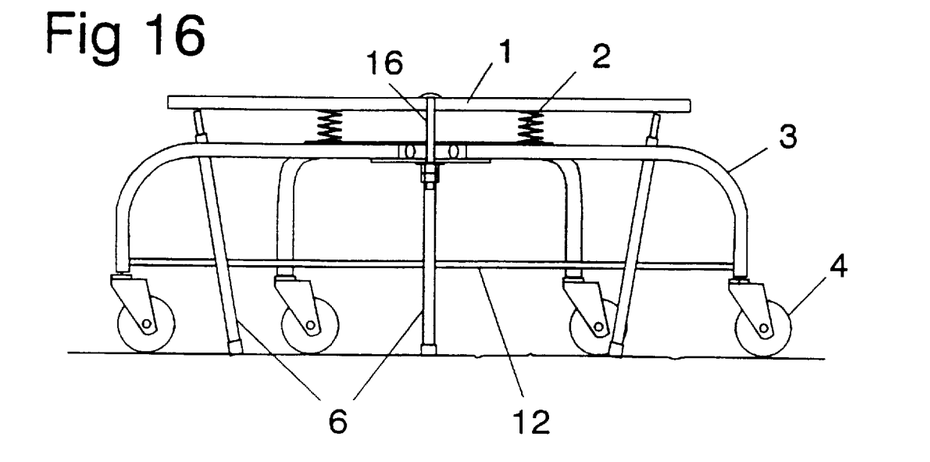
FIG. 16 shows its mid cross-section view.

As a third example of the invention the trolley is substantially the same as the first example but the platform and frame are round rather than rectangular. This is shown as a perspective view in FIG. 15 and as a mid cross-section view in FIG. 16. The platform may be supported on the frame by a central pivot, such as a round ball suitably mounted, in addition to the springs 2 described in the first example The central pivot may include or, alternatively, may be replaced by a single central bolt 16 between platform 1 and frame 3 which is adjusted to compress the springs. The springs 2 may also be located around the central area of the platform 1, for example on a 300 mm pitch circle diameter, when the compression of the springs by tightening the bolt, typically to a combined load of 200 kilograms, provides a stable central area of the platform on which the operator stands while the trolley is stationary. This also ensures that when the platform is horizontal the platform remains at the same height from the ground and the position of the drive rods remain the same independent of the operator's weight.

Figure 17:
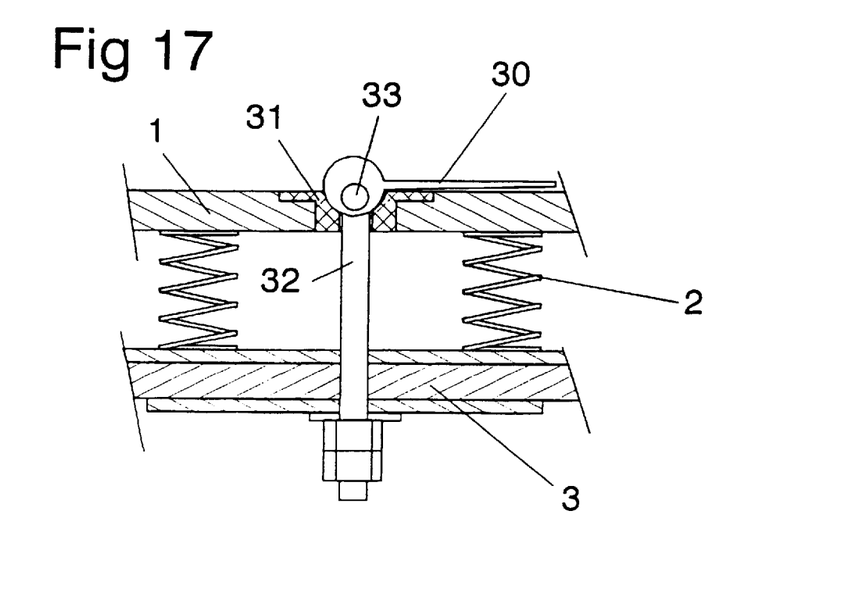
FIG. 17 shows a cross-section view of a trolley braking mechanism in the free position.
Figure 18:
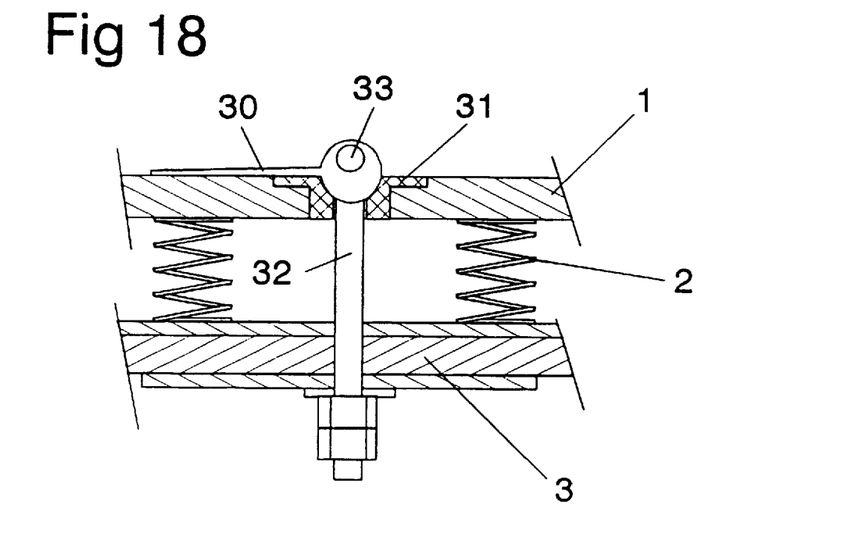
FIG. 18 shows the same view of the trolley braking mechanism in the braked position.

In this and the previous example the drive rods engage the ground when the platform is level and so brake the trolley to provide a safer working condition. In the first example the drive rods are just clear of the ground with the platform level so that the trolley is free to be moved by pushing or pulling to a new position or to transport materials. Transition to either position of the drive rods can be achieved by the mechanism shown in FIGS. 17 and 18. It comprises a levered cam 30 located in a half bearing 31 with the pin 33 coupling the levered cam to the head of the bolt 32. This assembly tensions the springs 2 supporting the platform 1 on the frame 3. In FIG. 17 the pin 33 is in its lower position allowing the platform 1 to rise and bring the drive rods just clear of the ground. In FIG. 18 the levered cam 30 has been moved to the left so that the pin 33 is in its higher position thus lowering the platform 1 so that the drive rods engage the ground.

In a further example, instead of using adjustable castors, height adjustment of the trolley is by stacking simple tables on top of the platform 1 or by raising the platform using a typically engineered scissor or similar mechanism. Drive rods 6 do not then have to be adjustable and so the location point to set their operating angle can be at any convenient position along the length of each rod.

In further examples of the invention the trolley is substantially the same as in the previous examples with the addition of safety rails, means to carry work tools and steps to mount the trolley.

I claim:

1. A self propelled trolley comprising a platform (1) supported by springs (2) on a frame (3) carried on castor wheels (4) and having drive rods (6) suspended from the platform (1), the drive rods (6) being adapted to engage the ground at an angle other than 90 degrees such that a person standing on the platform (1), by shifting his weight, can propel the trolley in any direction or brake to arrest motion.

2. A trolley as claimed in claim 1 wherein the platform (1) is supported on springs (2) placed around its central area which are compressed by tensioning a central bolt (16) securing the platform (1) to the main frame (3) of the trolley.

3. A trolley as claim 1 wherein the platform (1) is supported on the frame (3) by a central pivot and a multiplicity of springs (2).

4. A trolley as claimed in claim 1 wherein the platform (1) is supported on the frame (3) by a central annular ring or central array of pivot points (27) and held in place by one or more centrally placed bolts (25) under spring (26) tension.

5. A trolley as claimed claim 1 wherein said castor wheels are fixed wheels (15).

6. A trolley as claimed claim 1 wherein the angle of each rod (6) is determined by a universal pivot (10) joining it to the platform (1) and a location point (12) along its length.

7. A trolley as claimed claim 1 wherein a spring mechanism (13) or flexible material is incorporated in each rod (6) to smooth the propelling action.

8. A trolley as claimed claim 1 wherein V shaped guides (24) return the rods (6) to their angle location point (12) after their operation.

9. A trolley as claimed claim 1 wherein the platform (1) and frame (3) are round.

10. A trolley as claimed claim 1 wherein the drive rods (6) can be lowered to the ground or raised just clear by a levered (30) cam mechanism (33) changing the compression of the springs (2) between the platform (1) and main frame (3) of the trolley.

11. A trolley as claimed claim 1 wherein the platform (1) can be adjusted in height by sliding extensions (7,5) to the rods (6) and to the castors (4).

* * * * *